(12) United States Patent
Imanishi et al.

(10) Patent No.: US 6,174,258 B1
(45) Date of Patent: Jan. 16, 2001

(54) TOROIDAL-TYPE CONTINUOUSLY VARIABLE TRANSMISSION

(75) Inventors: Takashi Imanishi, Yokohama; Nobuo Goto, Fujisawa; Hiroshi Kato, Fujisawa; Nobuaki Mitamura, Fujisawa, all of (JP)

(73) Assignee: NSK Ltd., Tokyo (JP)

( * ) Notice: Under 35 U.S.C. 154(b), the term of this patent shall be extended for 0 days.

(21) Appl. No.: 09/181,911

(22) Filed: Oct. 29, 1998

(30) Foreign Application Priority Data

Oct. 30, 1997 (JP) .................................................. 9-297998

(51) Int. Cl.⁷ .................................................. F16H 15/38
(52) U.S. Cl. .................................................. 476/40
(58) Field of Search .............................. 476/40; 148/565, 148/567

(56) References Cited

U.S. PATENT DOCUMENTS

| | | | |
|---|---|---|---|
| 4,495,004 | * 1/1985 | Grilli et al. | 148/16.5 |
| 4,893,517 | 1/1990 | Nakano | 74/200 |
| 4,928,542 | 5/1990 | Nakano | 74/200 |
| 5,380,256 | * 1/1995 | Fukushima | 476/40 |
| 5,556,348 | * 9/1996 | Kokubu et al. | 476/40 |
| 5,618,114 | * 4/1997 | Katahira | 384/45 |
| 5,730,423 | * 3/1998 | Wu et al. | 251/331 |

FOREIGN PATENT DOCUMENTS

| | | |
|---|---|---|
| 59-155656 | 9/1984 | (JP) . |
| 62-71465 | 5/1987 | (JP) . |
| 63-203955 | * 8/1988 | (JP) . |
| 2-60753 | 5/1990 | (JP) . |
| 6-14603 | 2/1994 | (JP) . |
| 6-43404 | 6/1994 | (JP) . |
| 8-14350 | 1/1996 | (JP) . |
| 8-178007 | 7/1996 | (JP) . |
| 8-240251 | 9/1996 | (JP) . |
| 8-240252 | 9/1996 | (JP) . |
| 9-126288 | 5/1997 | (JP) . |

* cited by examiner

Primary Examiner—Lenard A. Footland
Assistant Examiner—Chong H. Kim
(74) Attorney, Agent, or Firm—Vorys, Sater, Seymour and Pease LLP

(57) ABSTRACT

There is provided a trunnion for a toroidal continuously variable transmission in which the material is strengthened against the wear and plastic deformation of a trunnion. The trunnion includes a base portion having a body portion, which connects and supports a base end portion of a displacement shaft at a surface intermediate portion, and a pair of plate portions, in which an edge apart from the body portion is a tip end edge, and a pair of axis (shaft) portions protruding from the outside surfaces of the plate portions in opposite directions to each other. The toroidal continuously variable transmission is characterized in that at least the rolling surface of a radial needle bearing for supporting the tilted rotation of the trunnion has a hardness not lower than HRC55, and a core portion has a hardness not lower than HRC20 and not higher than HRC45.

20 Claims, 7 Drawing Sheets

TOROIDAL-TYPE CONTINUOUSLY VARIABLE TRANSMISSION

BACKGROUND OF THE INVENTION

1. Field of the Invention

The present invention relates to a toroidal-type continuously variable transmission (CVT) and, more particularly, to a continuously variable transmission in which the material of a trunnion is strengthened and the surfaces of certain portions are hardened by a simplified method.

2. Related Background Art

As an automotive transmission, a toroidal-type continuously variable transmission shown in FIG. 1 and disclosed in Japanese Utility Model Application Laid-Open No. 62-71465 has been used. In the transmission as shown in FIG. 1, an input-side disk 12 is supported coaxially with an input shaft 11, and an output-side disk 14 is fixed to the end of an output shaft 13 disposed coaxially with the input shaft 11.

Trunnions 16 are provided with an axis (shaft) portion 15, which lies at a torsional position with respect to the input shaft 11 and the output shaft 13, at the outer side at both ends, and the base of a displacement shaft 17 is supported at the center of the trunnion 16. Thereby, the trunnion 16 is swayed or rocked around the axis portion 15 so that the tilt angle of the displacement shaft 17 can be adjusted freely. A power roller 18, which is held between the input-side disk 12 and the output-side disk 14, is rotatably supported by the displacement shaft 17. Opposed inside surfaces 12a and 14a of the input-side disk 12 and the output-side disk 14 each has a cross section consisting of a concave surface obtained by rotating an arc around the axis of the disks 12, 14, and the peripheral surface 18a of power roller 18 is formed into a spherical convex surface which abuts on the inside surfaces 12a and 14a.

Behind the input-side disk 12, there is provided a loading cam type pressing device 19, which elastically presses the input-side disk 12 toward the output-side disk 14. The pressing device 19 is made up of a cam plate 20 rotating together with the input shaft 11 and a plurality of rollers 22 retained by a retainer 21. On one side surface of the cam plate 20 is formed a cam face 23 in the circumferential direction, and a similar cam face 24 is also formed on the outside surface of the input-side disk 12. The plurality of rollers 22 are arranged between the cam faces 23 and 24 in the radial direction with respect to the center of the input shaft 11.

When the cam plate 20 is rotated as the input shaft 11 rotates, the plural rollers 22 are pressed on the cam face 24 of the input-side disk 12 by the cam face 23. As a result, the input-side disk 12 is pressed on the power roller 18 and rotated, and the rotation of the input-side disk 12 is transmitted to the output-side disk 14 via the power roller 18, so that the output shaft 13 is rotated.

When deceleration is performed between the input shaft 11 and the output shaft 13, the trunnion 16 is swayed in one direction around the axis portion 15, and the displacement shaft 17 is tilted so that the peripheral surface 18a of the power roller 18 abuts on the center-side portion of the inside surface 12a of the input-side disk 12 and the outer periphery-side portion of the inside surface 14a of the output-side disk 14. When acceleration is performed, the displacement shaft 17 of the trunnion 16 is swayed in the other direction, by which the peripheral surface 18a of the power roller 18 is allowed to abut on the outer periphery-side portion of the inside surface 12a of the input-side disk 12 and the center-side portion of the inside surface 14a of the output-side disk 14.

A more detailed description will now be given with reference to FIGS. 2 and 3. As as shown in FIGS. 2 and 3, an input-side disk 102 and an output-side disk 104 are rotatably supported around a tubular input shaft 115, each via a needle bearing 116. Also, a cam plate 110 is spline-engaged with the outer peripheral surface of the end of the input shaft 115, and the movement thereof in the direction apart from the input-side disk 102 is inhibited by a collar 117. A loading cam type pressing device 109, which is made up of the cam plate 110 and rollers 112, rotates the input-side disk 102 based on the rotation of the input shaft 115 while pressing it toward the output-side disk 104. An output gear 118 is connected to the output-side disk 104 via a key 119, so that both the elements are rotated synchronously.

A pair of trunnions 106 are supported by a pair of support plates 120 at a pivot portion 105 at both ends so as to be freely swayed around the pivot portion and displaced in the axial direction, and support a displacement shaft 107 at a circular hole 123 portion formed at an intermediate portion. Each of the displacement shafts 107 has an eccentric support shaft portion 121 and a pivotal shaft portion 122, and both the displacement shafts are in parallel to each other. The support shaft portion 121 is rotatably supported on the inside of the circular hole 123 via a needle bearing 124, and rotatably supports a power roller 108 at the pivotal shaft portion 122 via a needle bearing 125.

The paired displacement shafts 107 are provided at 180 degrees opposite positions opposed to each other. Also, the direction in which the pivotal shaft portion 122 is eccentric with respect to the support shaft portion 121 is the same as the direction in which the input-side disk 102 and the output-side disk 104 rotate, and the eccentric direction is substantially perpendicular to the installation direction of the output shaft 115. Therefore, the power roller 108 is supported in the installation direction of the input shaft 115 so as to be slightly displaced freely. As a result, even if the power roller 108 tends to be displaced in the axial direction of the input shaft 115 due to the dimensional accuracy, elastic deformation, etc. of component, this displacement can be absorbed without applying an excessive force to the component.

Also, between the outside surface of the power roller 108 and the intermediate portion inside surface of the trunnion 106, there are provided a thrust ball bearing 126 and a thrust needle bearing 127 in that order from the power roller 108 side. The thrust ball bearing 126, which allows the rotation of the power roller while carrying the load in the thrust direction applied to the power roller 108, is made up of a plurality of balls 129, an annular retainer 128 for rotatably retaining the balls, and an annular outer ring 130.

The thrust needle bearing 127 is made up of an annular race 131 shown in detail in FIGS. 4 and 5, a retainer 132, and needles 133, and the race 131 and the retainer 132 are combined so as to be slightly displaced freely in the rotational direction. The thrust needle bearing 127 is held between the inside surface of the trunnion 106 and the outside surface of the outer ring 130 in such a state that the race 131 abuts on the inside surface of the trunnion 106. Further, a driving rod 136 is connected to one end of the trunnion 106, and a driving piston 137 provided on the intermediate portion outer peripheral surface of the driving rod 136 is fitted in a driving cylinder 138 in an oil tight manner.

At the time of operation of the above toroidal-type CVT, the rotation of the input shaft 115 is transmitted to the input-side disk 102 via pressing device 109, transmitted to the output-side disk 104 via the paired power rollers 108, and taken out from an output gear 118. When the rotational speed ratio between the input shaft 115 and the output gear 118 is changed, the paired driving pistons 137 are displaced in directions reverse to each other, by which the paired trunnions 106 are displaced in reverse directions. As a result, the direction of a tangential force acting on the contact portion between the peripheral surface 108*a* of the power roller 108 and the inside surfaces 102*a* and 104*a* of the input-side disk 102 and the output-side disk 104 is changed. Thereupon, the trunnion 106 are swayed in directions reverse to each other around axis portions 105 pivotally supported by the support plates 120.

Also, FIG. 6 shows another mechanism for tilting a trunnion 156 around an axis portion 155 at the time of speed change (U.S. Pat. No. 4,928,542). The axis portion 155 is supported on a housing 167 by a needle bearing 166 so as to be slightly displaced freely in the rotational and axial directions. At the time of speed change, when pressure oil is fed into a hydraulic cylinder 168 supported on the housing 167, and the trunnion 156 is displaced in the axial direction, the contact positional relationship between an outer peripheral surface 159*a* of a power roller 159 and the inside surfaces of the input-side disk and the output-side disk is changed, so that the trunnion 156 is swayed around the axis portion 155.

When the input disk and the output disk are half toroidal as described above, the trunnion is required to have durability and toughness (there are no such requirements for full toroidal). Specifically, each portion of the trunnion 106 shown in FIG. 7, which is an enlarged view of FIG. 3, is required to have the following functions and characteristics.

(i) Support of a Force Applied to the Power Roller

Lines connecting a contact portion P between the power roller 108 and the disks 102 and 104 to a tilted rotation center Q of the power roller 108 intersect each other and make a contact angle 2θ. Therefore, a thrust force (4 tons and higher at a maximum) occurs on the power roller 108. The trunnion 106 must tiltedly rotate the power roller 108 around the tilted rotation center while carrying the thrust force at a central portion 161*d* (FIG. 8). At the same time, the thrust force must be such that the internal forces compensate each other between the plural power rollers 108 disposed in one cavity, so that it is necessary to install a yoke 120 on the trunnion 106 as an internal force compensating member.

(ii) Smooth Tilted Rotation

The power roller 108 must rotate smoothly around the axis portion 105 via the trunnion 106. If this rotation is not smooth, sudden speed change occurs, which produces an adverse effect on the riding quality of vehicle. The tilted rotation of the trunnion 106 is supported by the yoke 120. However, since a force (2 tons and higher) of a half of the aforementioned power roller thrust force is applied to the axis portion 105 (FIG. 8), a radial needle bearing 141 is indispensable to smooth tilted rotation.

(iii) Movement in y Direction

The axis of the power roller 108*a* is somewhat shifted with respect to the axes of the disks 102 and 104, and the power roller 108 is tiltedly rotated by a side slip produced by a difference in velocity vector of a power transmission section, by which speed change is effected. For this purpose, the trunnion 106 must be moved slightly in the direction of the axis portion 105 (y direction). This movement is accomplished by, for example, a hydraulic piston 137 (FIG. 3), and the movement amount is generally ±2 mm or smaller. Since a slight tilt is produced between the trunnion 106 and the yoke 120 by this movement in y direction, a spherical ring 142 is provided at the outer periphery of the radial needle bearing 141 at the neck portion of the trunnion 106 to allow this tilt, and is also used as the outer ring of the needle bearing.

(iv) Tilted Rotation Stopper

If the power roller 108 changes speed beyond the design speed change range, it comes off from the outer peripheral portion or the inner peripheral portion of the disks 102 and 104, and the restoration becomes impossible. To prevent this, a mechanical stopper for inhibiting the tilted rotation of the power roller 108 is needed. However, it is difficult to incorporate such a mechanism because the power roller 108 is rotating. Therefore, a part of the trunnion 106 tiltedly rotating integrally with the power roller 108 is brought into contact with the stopper. For this reason, the trunnion 106 is required to have a contact face which comes into contact with the stopper.

(v) Prevention of Power Roller Backup Bearing from Coming Off

In order to absorb the dimensional error and elastic deformation of a speed changing mechanism of CVT and the axial movement of the input disk 102 due to the y movement at the time of speed change and to equalize the contact point pushing forces on the input and output sides, the power roller 108 is supported so as to effect pivot movement with respect to the trunnion 106. However, since the thrust force of 4 tons and higher at a maximum is produced between the power roller and the trunnion as described above, the thrust needle bearing 127 is disposed to effect the pivot movement smoothly. To prevent the retainer 132 of the thrust needle bearing 127 from coming off, a part of the retainer and the shoulder portion provided on the trunnion 106 are brought into contact with each other.

Further, the trunnion 106 is required to have durability as follows.

(a) Cyclic Bending Fatigue

As described in item (i), the thrust force is applied to the trunnion 106. The central portion of the trunnion 106 is subjected to a load from the power roller 108, and both ends thereof are subjected to a load from the yoke 120. That is to say, the trunnion 106 is subjected to cyclic bending, and the change in bending stress depends on the generating force and speed change ratio. The portion where the bending stress is high is required to have toughness (described later).

(b) Rolling Fatigue

As described in item (ii), the trunnion 106 must be used as a race of a rolling bearing 141. Therefore, this portion is required to have a sufficient rolling fatigue resistance.

(c) Durability Against Cyclic Collision

As described in items (iv) and (v), the trunnion 106 has the contact portions with the power roller 8 and the retainer 132, so that a collision accompanied by a considerable shock is expected in the automotive application. Therefore, wear resistance and collapse resistance are required.

For the aforementioned requirements, there are well known examples described below.

For the support of force applied to the power roller, a support construction has been disclosed in, for example, Japanese Patent Application Laid-Open No. 59-155656 etc., but there is no description regarding the resistance to cyclic bending fatigue of the trunnion.

For smooth tilted rotation, a support construction has been disclosed in, for example, Japanese Patent Application Laid- Open No. 59-155656 etc. In the Publications, a hardened ring is mounted as a needle bearing race at the neck portion of trunnion, and the trunnion is not used as a bearing race. This method has a difficulty in lightening the dimensional restriction at the time of high output as described later.

For the movement in y direction, a spherical ring mounted at the neck portion of trunnion has been disclosed in, for example, Japanese Utility Model Application Laid-Open No. 6-14603.

For the tilted rotation stopper, a stopper construction has been disclosed in Japanese Utility Model Application Laid-Open No. 6-43404, but there is no description regarding the durability of the contact portion.

For the prevention of the thrust needle bearing from coming off, the preventive construction has been disclosed in Japanese Patent Application Laid-Open No. 8-240251, but there is no description regarding the durability of the contact portion.

Japanese Utility Model Application Laid-Open No. 2-60753 has disclosed an example in which a hardened steel collar is press fitted between the trunnion and the needle bearing. With this method, however, as shown in FIG. 7, a thickness of the trunnion 106 and the yoke 120 cannot be increased sufficiently, so that there is a disadvantage in terms of strength and rigidity. Also, for the trunnion 106, the dimension of portion A between a corner portion 161b and a corner portion 161c is shortened by the dimensional restriction. Since this portion is subjected to a high bending stress due to a bending moment M, toughness is required.

In more detail, since the intersection Q of the contact lines P of the trunnion 106 and the power roller 108 lies on the axis portion 105, the power roller 108 is positioned in the trunnion 106, so that an offset dimension k between Q and inner ring inside surface occurs. If an attempt is made to decrease the dimension k, the outer ring thickness l or ball diameter m decreases, so that the strength of outer ring of the power roller 108 is lowered, or the capacity of power roller bearing is decreased. Therefore, the dimension k which is large to some extent is needed.

Also, in a layout disclosed in Japanese Patent Application Laid-Open No. 9-126288, if a distance g between Q and the yoke 120 becomes too large, an interference with the parts of vehicle poses a problem. Therefore, g must be small to some extent. However, if a dimension i of a portion 161a is made too small, the yoke 120 becomes thin, decreasing the rigidity, or the length of the shaft of the radial needle bearing supporting the axis portion 105 is shortened, resulting in insufficient capacity. Therefore, the dimension h of portion 161c must be small to some extent.

Further, considering an interference between the disks 102 and 104 and the yoke 120 in addition to the aforementioned restriction in mounting on the vehicle, the outside diameter φf of the yoke must be small to some extent. For the reason of the strength of the yoke 120 itself, edge portion d is needed to some extent. Also, by the arrangement of the spherical ring 142 and the radial needle bearing 141, the outside diameter φa of the bearing attachment face becomes small. However, if the φa portion of trunnion is made too small, the dimension of portion A becomes too small, so that the bending strength cannot be assured. Since it is difficult to decrease φa as described above, it is difficult to use a hardened collar separate from the trunnion as the inner ring of radial needle bearing.

The dimensional restriction described above decreases the dimension of portion A. Thereby, the bending stress increases, so that toughness is needed particularly at portion A.

Thus, the trunnion for half toroidal CVT is required to meet the requirement of durability for plural items peculiar to the trunnion under various dimensional restrictions. Specifically, the trunnion is required to meet the requirement that the portion requiring hardness is hardened, and conversely that the portion requiring toughness is softened. The present invention has been made to meet the above requirements.

SUMMARY OF THE INVENTION

To achieve the above object, the present invention provides a trunnion, for a toroidal-type CVT, including a base portion having a body portion, which connects and supports a base end portion of a displacement shaft at a surface intermediate portion, and a pair of plate portions, in which an edge apart from the body portion is a tip end edge, and a pair of axis portions protruding from the outside surface of each plate portion facing in the opposite directions to each other, (i) at least the rolling surface (outer peripheral surface of axis portion) of a radial needle bearing for supporting the tilted rotation has hardness not lower than HRC55, and (ii) a core portion of the trunnion has hardness not lower than HRC20 and not higher than HRC45 (carbon content: 0.30 to 0.60%).

Also, a contact portion (consisting of the plate portion) for restricting the tilted rotation is high-frequency heat treated and has hardness not lower than HRC55, and a contact portion (consisting of the plate portion) for regulating the swaying of a retainer for a thrust needle bearing is high-frequency heat treated and has hardness not lower than HRC55.

On the other hand, the trunnion may be formed of a steel material with a carbon content not higher than 0.25%, and the rolling surface of radial needle bearing may have hardness not lower than HRC55 and the core portion may have hardness not higher than HRC45 by carburizing.

DETAILED DESCRIPTION OF THE PREFERRED EMBODIMENTS

An embodiment (toroidal-type CVT) of the present invention will be described below with reference to the accompanying drawings.

Figures 9A, 9B:
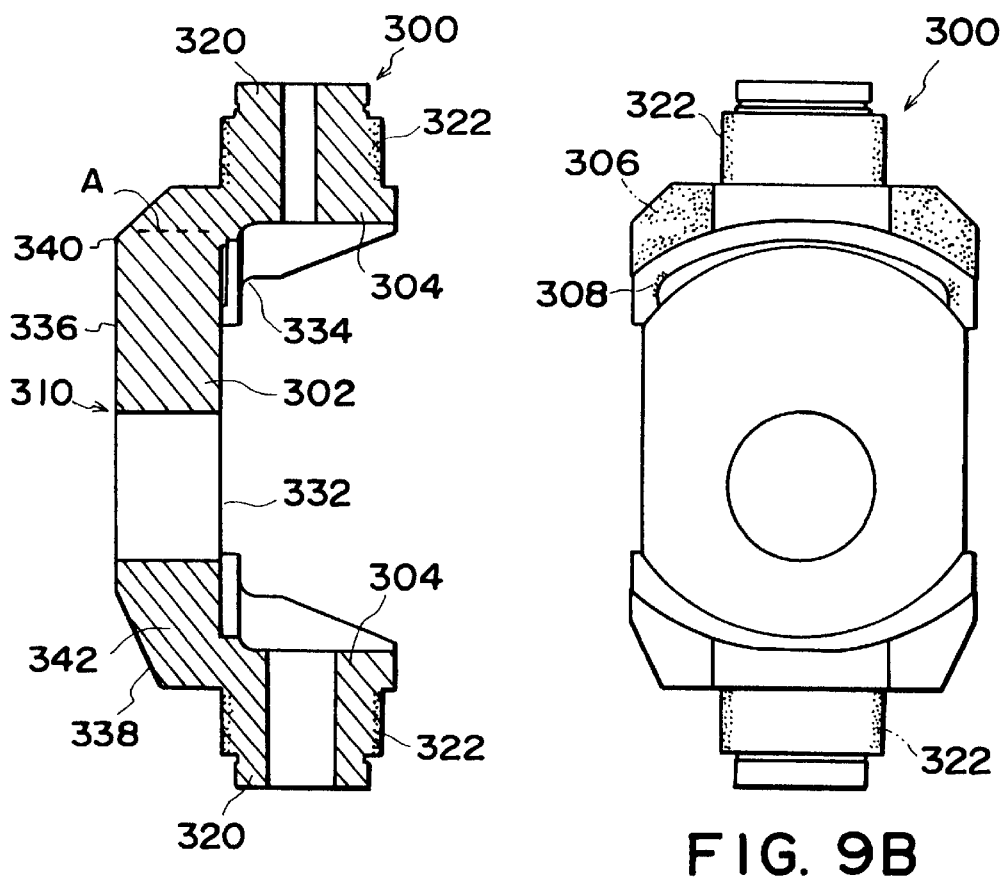
FIGS. 9A and 9B are a side view and a front view showing one embodiment of a trunnion in accordance with the present invention, respectively.

A trunnion 300 shown in FIGS. 9A and, at each end of the body portion, 9B comprises a base portion 310 having a body portion 302 and a plate portion 304 and an axis shaft portion 320. The plate portion 304 has a stopper portion 306 with which a tilted rotation stopper contact comes into contact and a contact portion 308 with which a thrust needle bearing retainer comes into contact.

Here, the whole of the trunnion 300 is formed of a steel material with a carbon content of 0.3 to 0.6%. A rolling surface portion 322 of a radial needle bearing for carrying the tilted rotation, the stopper contact portion 306, and the contact portion 308 with which thrust needle bearing, which prevents a backup bearing from flying out, comes into contact are high-frequency heat treated into HRC55 or higher, and other portions such as the core portion (portion A) are refining heat treated into HRC45 or lower.

If the trunnion 300 is heated as a whole so that the core portion is hardened, the toughness is lost, and the trunnion becomes brittle. Therefore, the fatigue failure strength is lost, and the trunnion is broken. Also, the material of the trunnion 300 is a steel material with a carbon content of 0.4% or more in order to use high-frequency heat treatment which is easy to perform. The surface portions 306, 308 and 322 requiring hardness are high-frequency heat treated to obtain a hardness of HRC50 and higher. Aside from high-frequency heat treatment, carburizing provides a hardness of HRC55 and higher. In this case, the trunnion 300 is preferably formed of a steel material with a carbon content of 0.25% or less.

This condition was obtained by making experiments with trunnions having various hardness. For the experiment, trunnions having a total height (dimension H in FIG. 8) of 140 mm were used as an example. Table 1 gives the experimental results.

The core portion hardness in Table 1 is the hardness at point A. The core portion hardness was measured at a point of approximately ½ of a perpendicular connecting the corner end portion 334 on a backup surface 332 of the trunnion 300 in cross section, a chamfering end backup 338 on a back surface 336, and a point 340 where the back surface is in parallel. In the experiment shown in Table 1, a load of 4 tons was applied to the outer peripheral surface of the power roller 108, the axis portion 322 was swayed ±20° in this state, and the presence of separation of the bearing rolling surface portion and the bending dimension (change in dimension before and after test) of back surface 336 after $10^7$ times of swaying were verified. The breaking of folded portion 342 shows the result of whether or not the portion is broken until $10^7$ times of swaying.

TABLE 1

| No | Material | C content | Surface portion hardness | Core portion hardness | Experimental result | Judgment |
|---|---|---|---|---|---|---|
| 1 | SCM445 | 0.45% | HRC56 | HRC36 | No broken portion | o |
| 2 | SCM435 | 0.35% | HRC57 | HRC32 | No broken portion | o |
| 3 | S45C | 0.45% | HRC59 | HRC38 | No broken portion | o |
| 4 | SCM420 | 0.20% | HRC52 | HRC30 | Bearing rolling portion separated | x |
| 5 | SUJ2 | 1.00% | HRC60 | HRC48 | Folded portion broken | x |
| 6 | A | 0.63% | HRC60 | HRC47 | Folded portion | x |
| 7 | S45C | 0.45% | HRC58 | HRC18 | broken Large deformation | x |
| 8 | SCM440 | 0.40% | HRC57 | HRC17 | Large deformation | x | o: good
x: bad

Although not shown in Table 1, if the hardness of the axis portion 320 of the trunnion 300 is lower than HRC55, this portion is broken regardless of the carbon content, and if the hardness of the core portion (portion A) exceeds HRC45, the trunnion 300 is broken. From this result, the trunnion requires a predetermined condition.

Figures 7, 8:
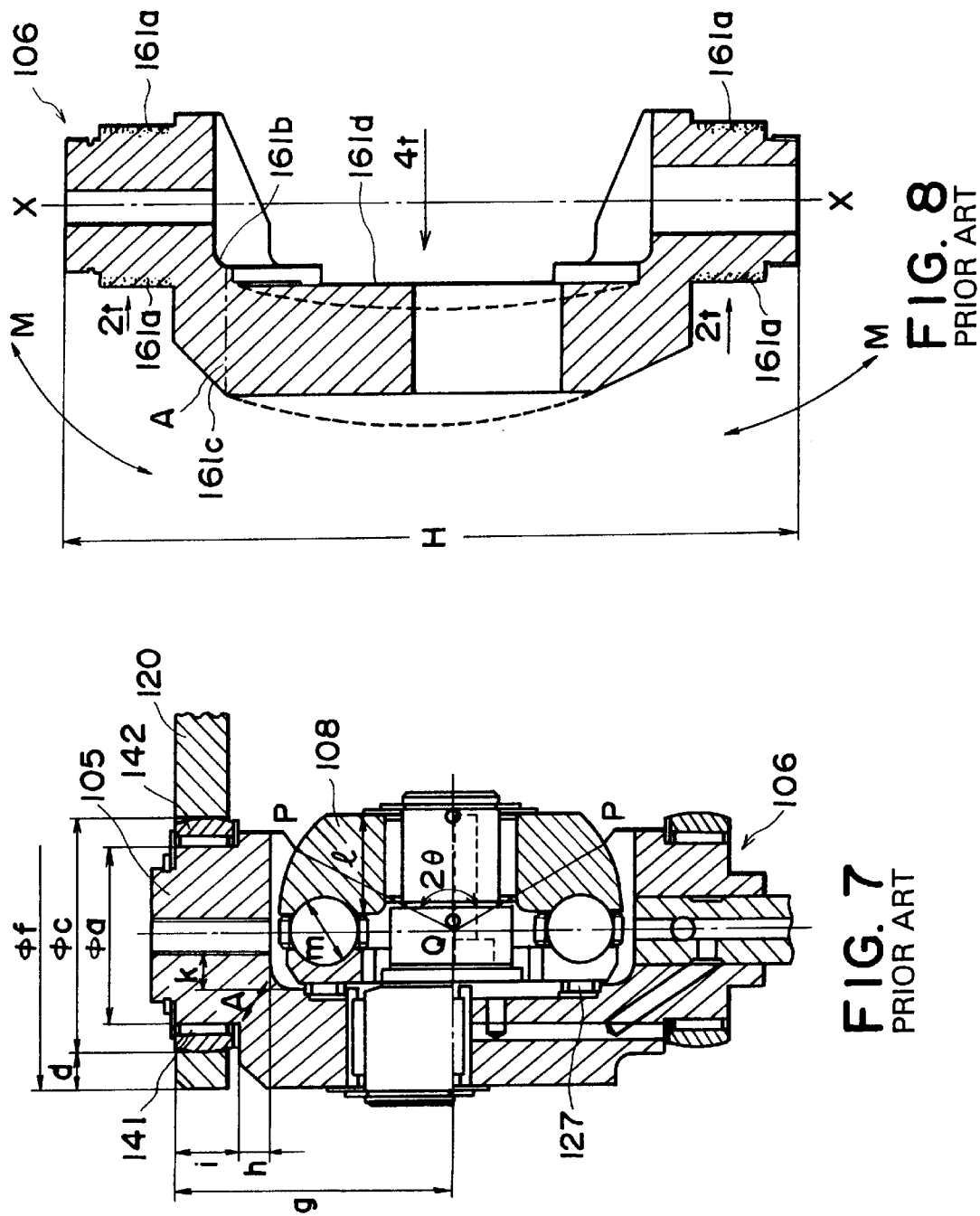
FIG. 7 is a sectional view for illustrating problems with the conventional example.
FIG. 8 is a partial sectional view for illustrating problems with the conventional example.

If the hardness of the core portion is lower than HRC 20, the trunnion 300 is deformed plastically even if the carbon content is 0.40 to 0.45%, and a trouble occurs at the time of speed change as indicated by the broken line in FIG. 8. In Nos. 7 and 8, since the hardness of the core portion was low (because the trunnion was manufactured by increasing the tempering temperature in refining), an outwardly convex (as indicated by the broken line in FIG. 8) plastic deformation with respect to the line X—X became large. In No. 4, since the carbon content of the material was lower than 0.3%, resulting in insufficient surface hardness, the bearing rolling portion 322 consisting of a rolling surface with the needle bearing was separated. In Nos. 5 and 6, since the carbon content exceeded 0.6% and the hardness of the core portion was too high, the folded portion 302 was broken.

Considering the above-described results, in Nos. 1 to 3 in Table 1, since the carbon content was in the range of 0.30% to 0.60%, the hardness of the surface portion was not lower than HRC55, and the hardness of the core portion was in the range of HRC20 to 45, neither the separation of bearing rolling portion nor the breakage of folded portion occurred.

Figure 10:
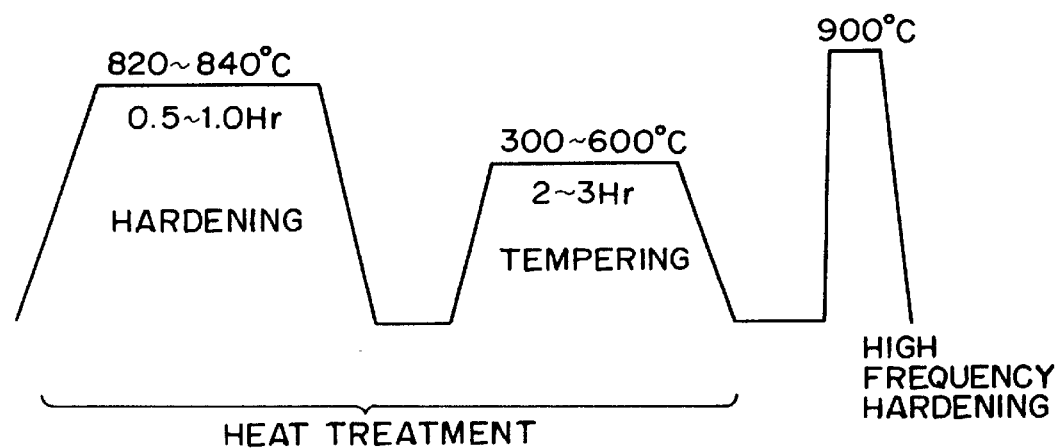
FIG. 10 is a time chart showing a timing example of refining and high-frequency heating.

As a method for manufacturing the trunnion as described above, considering the cost and productivity, it is preferable that the whole of trunnion be refined by quenching at 820 to 840° C. for 0.5 to 1.0 H and tempering at 300 to 600° C. for 2 to 3 H, and thereafter the portions 306, 308 and 322 requiring hardness be high-frequency heat treated at about 900° C. as shown in FIG. 10. As the material, a material with a carbon content not lower than 0.3% and not higher than 0.6% is preferable (see Nos. 5 and 6 in Table 1). If the carbon content is higher than 0.6%, the core portion is easily hardened. To keep hardness not higher than HRC45, the tempering temperature in refining must be increased considerably, so that heat-treatment deformation increases, or the heat-treatment cost is increased. The carbon content for obtaining surface hardness not lower than HRC55 is 0.2% at a minimum (for example, "Steel Material Handbook" Sec. 3.1, p. 85). However, considering the mass effect in tempering and other factors, a carbon content not lower than 0.3% is preferable considering a margin.

Figure 1:
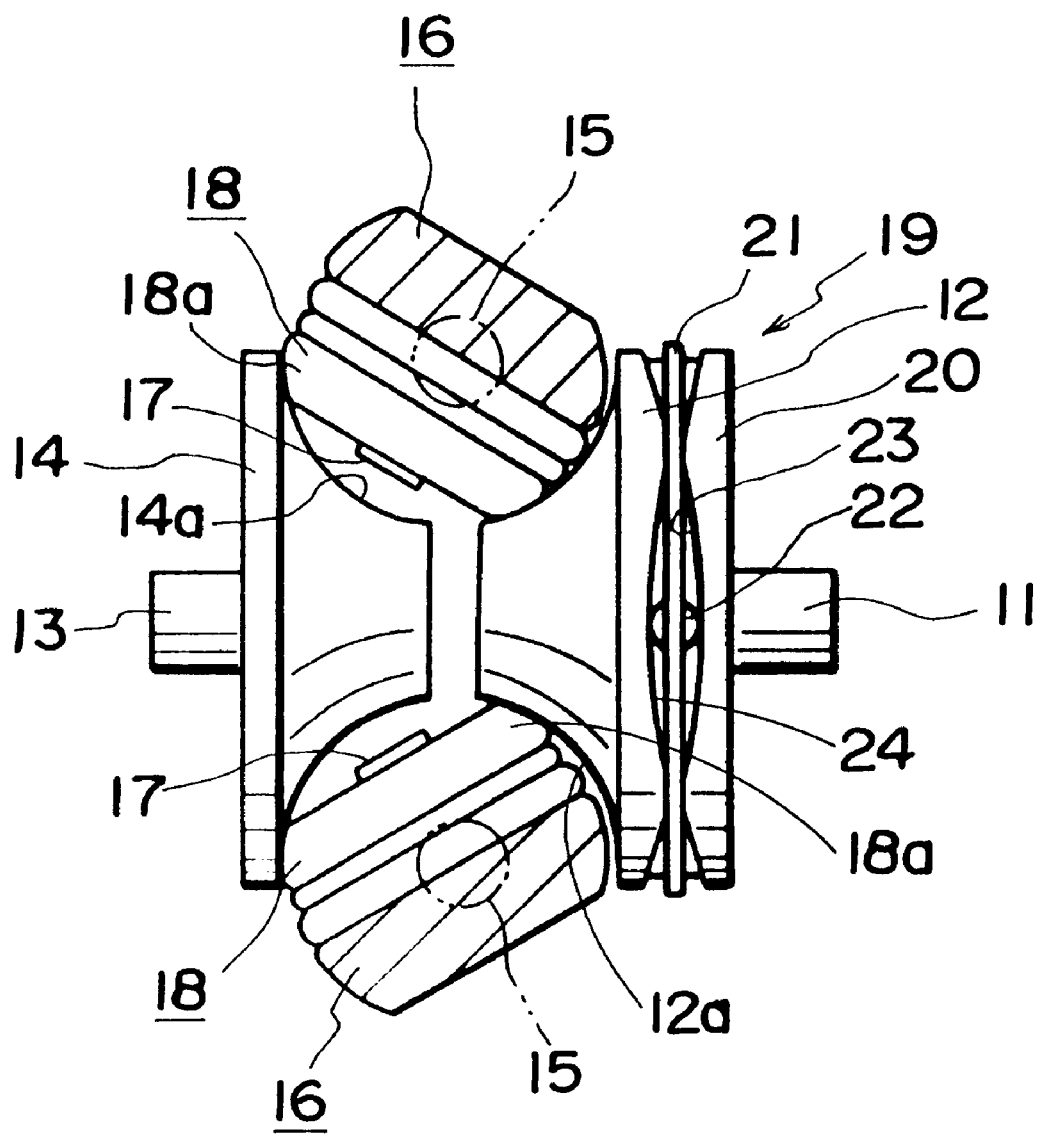
FIG. 1 is a side view showing a basic configuration of a conventional toroidal continuously variable transmission.
Figure 2:
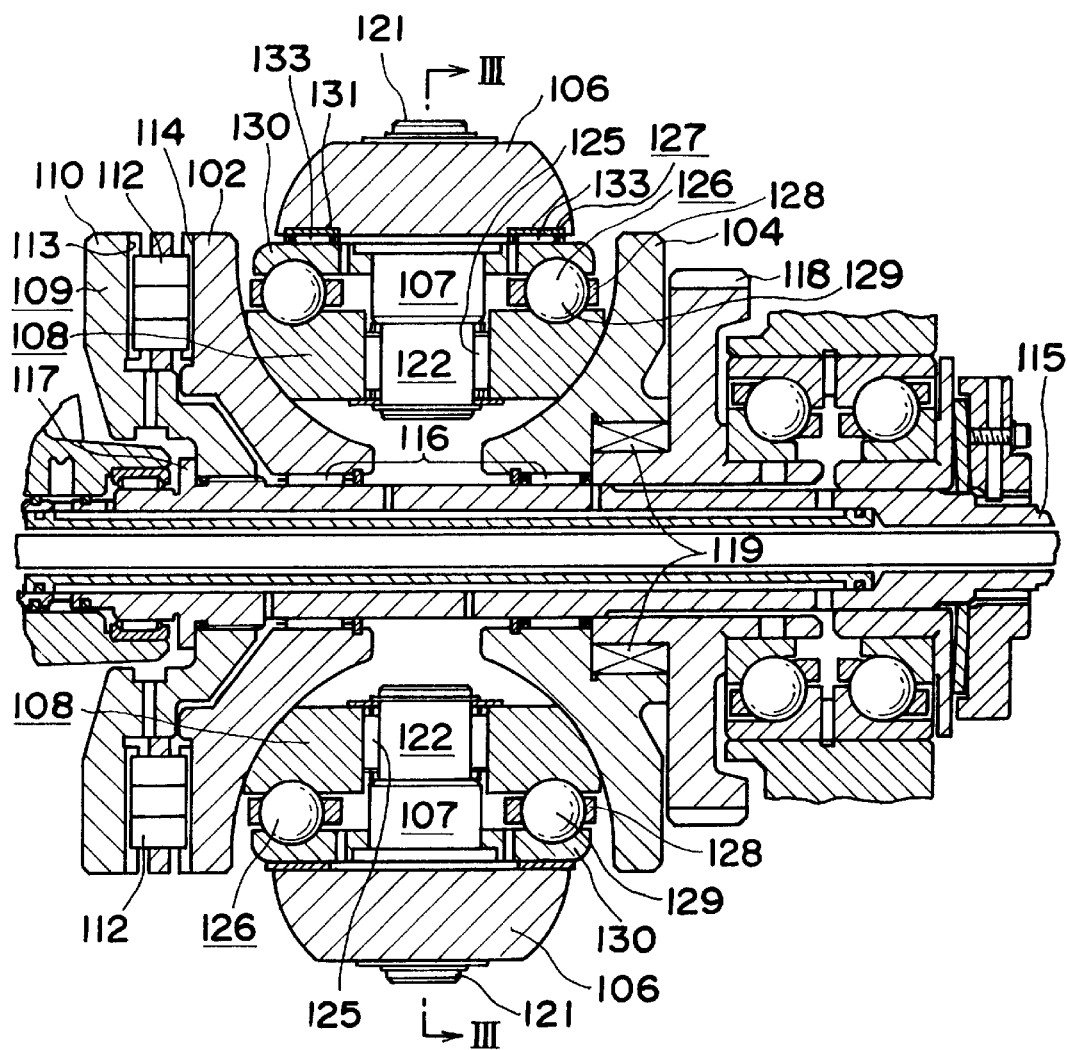
FIG. 2 is a sectional view showing one example of a specific construction of a conventional example.
Figure 3:
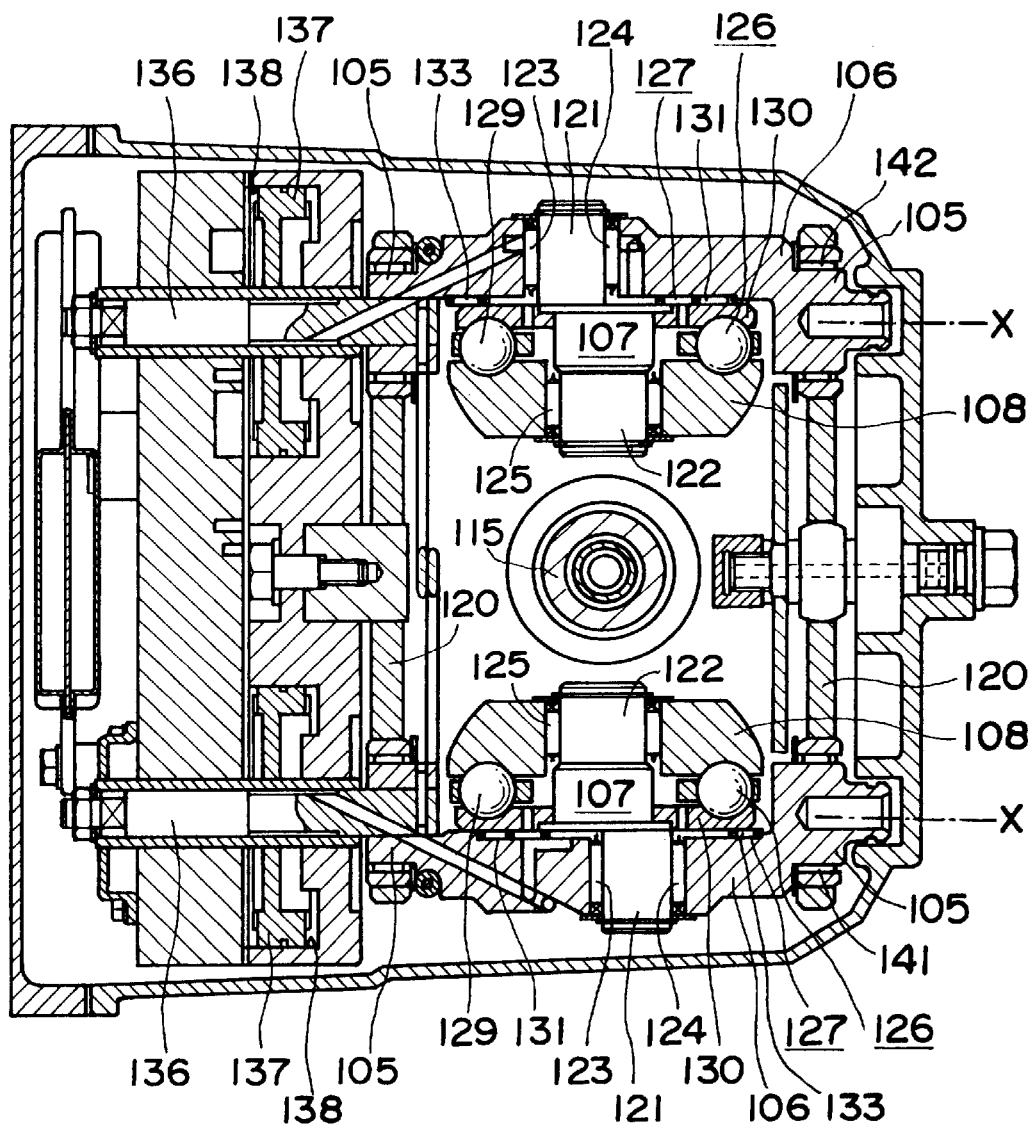
FIG. 3 is a sectional view taken along the line III—III of FIG. 2.
Figure 4:
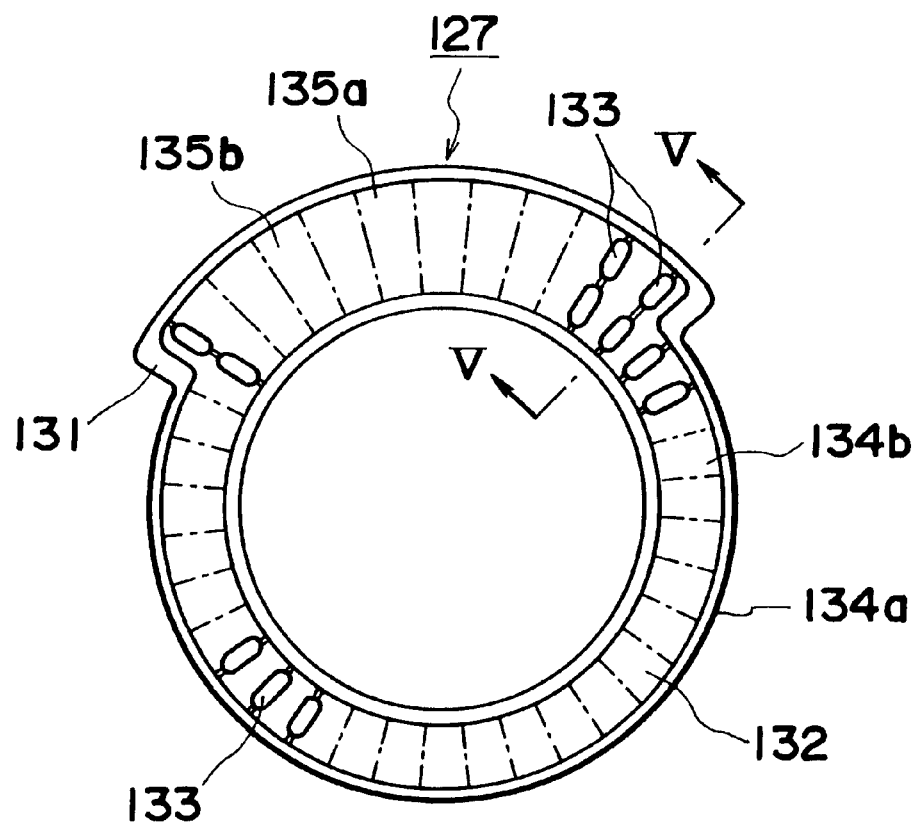
FIG. 4 is a plan view showing a thrust needle bearing of a conventional example.
Figure 5:
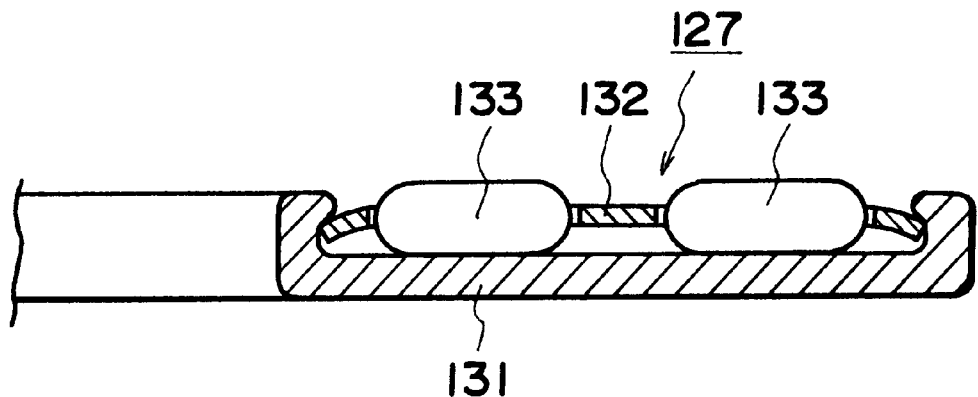
FIG. 5 is an enlarged sectional view taken along the line V—V of FIG. 4.
Figure 6:
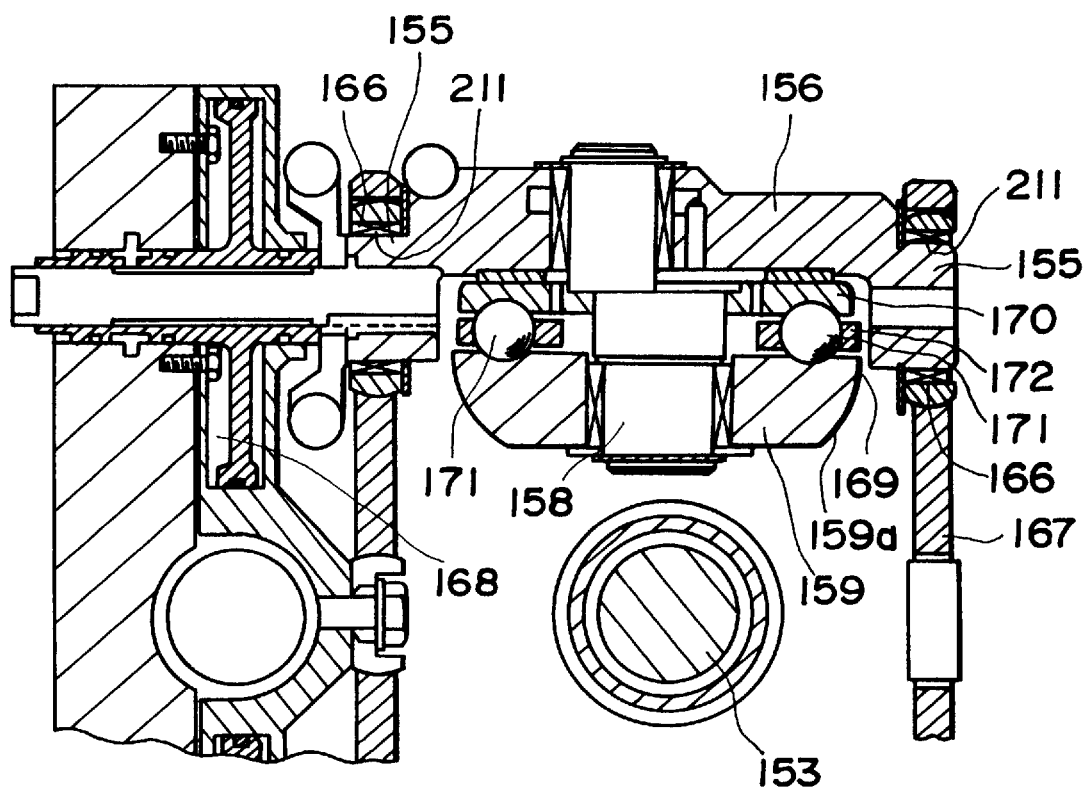
FIG. 6 is a sectional view showing another conventional example.

The depth of effective hardened layer of the high-frequency hardened portion should be about two times the depth at which a shearing stress produced in the material by the contact of a rolling body 141 (FIG. 3) of bearing is at a maximum. At this portion, the depth at which the shearing stress is at a maximum is relatively shallow, so that a deep hardened layer is unnecessary. However, in the high-frequency heat treatment, the control of hardened layer depth performed so as to be shallow increases the cost, so that the hardened layer depth should preferably be about 0.5 to 2.0 mm.

If the trunnion with the aforementioned hardness is manufactured, refining and high-frequency heating are not necessarily needed, and for example, carburizing or carbonitriding may be applied to a blister steel.

In the embodiment shown in FIGS. 9A and 9B, three places including the rolling surface portion 322, the contact portion 306 of tilted rotation stopper, and the contact portion 308 of backup bearing are high-frequency heat treated into HRC50 and higher. However, if at least the rolling surface portion 322 is high-frequency heat treated into HRC55 and higher, the trunnion can be applied to a low-speed toroidal continuously variable transmission even if other portions have hardness not higher than HRC50.

The present invention can be applied to a trunnion of a three roller type toroidal continuously variable transmission of the type disclosed in Japanese Patent Application Laid-Open No. 8-14350.

Also, the present invention can be applied to a toroidal continuously variable transmission in which the tilt angle of trunnion is restricted surely (Japanese Utility Model Application Laid-Open No. 6-43404) and a toroidal continuously variable transmission in which an excessive face pressure is prevented from being applied to the rolling surface of needle in the thrust needle bearing and the needle is prevented from coming off from the pocket of a retainer (Japanese Patent Application Laid-Open No. 8-240252). Further, the present invention can be applied to a double cavity type toroidal CVT such as U.S. Pat. No. 4,893,517.

As described above, according to the continuously variable transmission in accordance with the present invention, since the material of the trunnion is a preferably steel material with a carbon content in the range of 0.3 to 0.6%, the trunnion itself has toughness, so that the strength against fatigue failure can be increased without breakage. Also, since the functional surfaces requiring hardness are preferably subjected to high-frequency heat treatment which is easy to perform or carburizing to obtain a predetermined HRC value, the hardness of surfaces of the necessary portions can be set, so that the wear resistance and durability required for an automotive part can be secured.

What is claimed is:

1. A trunnion for a toroidal-type continuously variable transmission having an input-side disk, an output-side disk which is disposed coaxially with the input-side disk and supported rotatably with respect to the input-side disk, and a power roller held between the input-side disk and the output-side disk, and wherein opposed inside surfaces of the input-side disk and the output-side disk are brought into contact with a peripheral surface of the power roller, characterized by that said trunnion is constructed to support said power roller and to rock around an axis transverse to a rotation axis of said input-side disk and said output-side disk, said trunnion includes a base portion having a body portion with an intermediate portion to connect and support a base end portion of a displacement shaft, a pair of plate portions at opposite ends of said body portion, and a pair of shaft portions protruding in opposite directions from outside surfaces of said plate portions, and said trunnion includes at least a rolling surface of a radial needle bearing for supporting the rocking movement of said trunnion having a hardness not lower than HRC55, and a core portion having a hardness not lower than HRC20 and not higher than HRC45.

2. A trunnion according to claim 1, wherein the trunnion has a contact portion disposed to contact a stopper for restricting said rocking movement, and the contact portion is high-frequency heat treated and has a hardness not lower than HRC55.

3. A trunnion according to claim 1, wherein the trunnion has a contact portion disposed to regulate swaying of a retainer for a thrust needle bearing capable of pivot motion while backing up the power roller, and the contact portion is high-frequency heat treated and has a hardness not lower than HRC50.

4. A trunnion according to claim 1, wherein the trunnion is formed of a steel material with a carbon content of 0.30% to 0.60%, and said rolling surface is high-frequency heat treated to a hardness not lower than HRC55 and said core portion is refining heat treated to a hardness not higher than HRC40.

5. A trunnion according to claim 1, wherein the trunnion is formed of a carburized material with a carbon content not higher than 0.25%, and said rolling surface is treated to a hardness not lower than HRC55 by carburizing.

6. A toroidal-type continuously variable transmission including said trunnion according to claim 1.

7. A toroidal-type continuously variable transmission including said trunnion according to claim 2.

8. A toroidal-type continuously variable transmission including said trunnion according to claim 3.

9. A toroidal-type continuously variable transmission including said trunnion according to claim 4.

10. A toroidal-type continuously variable transmission including said trunnion according to claim 5.

11. A trunnion according to claim 1, wherein the trunnion has a contact portion disposed to contact a stopper for restricting said rocking movement, and the contact portion is high-frequency heat treated and has a hardness not lower than HRC50.

12. A trunnion according to claim 1, wherein said rolling surface has a hardened-layer depth from about 0.5 to about 2.0 mm.

13. A trunnion according to claim 2, wherein said rolling surface has a hardened-layer depth from about 0.5 to about 2.0 mm.

14. A trunnion according to claim 3, wherein said rolling surface has a hardened-layer depth from about 0.5 to about 2.0 mm.

15. A trunnion according to claim 4, wherein said rolling surface has a hardened-layer depth from about 0.5 to about 2.0 mm.

16. A toroidal-type continuously variable transmission including said trunnion according to claim 11.

17. A toroidal-type continuously variable transmission including said trunnion according to claim 12.

18. A toroidal-type continuously variable transmission including said trunnion according to claim 13.

19. A. toroidal-type continuously variable transmission including said trunnion according to claim 14.

20. A toroidal-type continuously variable transmission including said trunnion according to claim 15.

* * * * *